United States Patent
Udono et al.

(10) Patent No.: US 7,543,029 B2
(45) Date of Patent: Jun. 2, 2009

(54) MAILING LIST MANAGEMENT SYSTEM AND ELECTRONIC MAIL TRANSMITTING/RECEIVING APPARATUS

(75) Inventors: Yuji Udono, Osaka (JP); Yasutaka Goto, Osaka (JP); Ryuji Itakura, Osaka (JP); Yoshifumi Tanimoto, Osaka (JP)

(73) Assignees: Murata Kikai Kabushiki Kaisha, Kyoto (JP); Fujitsu Limited, Kawasaki (JP)

( * ) Notice: Subject to any disclaimer, the term of this patent is extended or adjusted under 35 U.S.C. 154(b) by 954 days.

(21) Appl. No.: 10/741,993

(22) Filed: Dec. 19, 2003

(65) Prior Publication Data
US 2004/0148432 A1 Jul. 29, 2004

(30) Foreign Application Priority Data
Dec. 20, 2002 (JP) .............................. 2002-370863

(51) Int. Cl.
G06F 15/16 (2006.01)
(52) U.S. Cl. ....................... 709/206; 709/223; 709/226; 714/2
(58) Field of Classification Search ................ 709/203, 709/206, 223, 226, 225; 714/1, 2, 4

See application file for complete search history.

(56) References Cited

U.S. PATENT DOCUMENTS

| 5,581,757 | A  | * | 12/1996 | Maxey | 709/242 |
| 6,212,552 | B1 | * | 4/2001  | Biliris et al. | 709/206 |
| 6,427,164 | B1 | * | 7/2002  | Reilly | 709/206 |
| 6,957,248 | B2 | * | 10/2005 | Quine et al. | 709/206 |
| 7,254,573 | B2 | * | 8/2007  | Burke | 707/3 |
| 2004/0078601 | A1 | * | 4/2004 | Tengwall et al. | 713/201 |

FOREIGN PATENT DOCUMENTS

JP 8-316984 11/1996

* cited by examiner

*Primary Examiner*—Ramy M Osman
(74) *Attorney, Agent, or Firm*—Katten Muchin Rosenman LLP (57) ABSTRACT

On the occasion of receiving an electronic mail to a predetermined receiving address defined as a mailing list, there is stored mailing list information recorded beforehand with a transfer destination address of the electronic mail and a bypass-transfer destination address for bypassing the transfer destination address, and, on the occasion of transferring the electronic mail to the transfer destination address, in case a fault occurs in the transfer destination and the transferring is difficult, the bypass-transfer destination address is read out so that the received electronic mail is transferred thereto by bypassing the transfer destination address.

8 Claims, 8 Drawing Sheets

| NUMBER | SENDER | JUST-ANTERIOR SERVER | DATE | CASE NAME | PAGE COUNT | RESULT | REMARKS |
|---|---|---|---|---|---|---|---|
| 01 | terminal-a1@server-a.***.com | SERVER C | 09/20 15:30:45 | WRITTEN ESTIMATE | 5 | OK | |
| 02 | terminal-a2@server-a.***.com | SERVER A | 09/20 17:05:15 | WRITTEN ORDER | 3 | OK | BYPASS |

```
Message-ID: <B0000044967@terminal-c1.server-c.***.com>
Date: Wed. 06 Jan 2003 18:39:46 +0900
From: terminal-c1@server-c.***.com
To: server-a@server-a.***.com
Subject: DB update
MIME-Version: 1.0
Content-Type:multipart/mixed;
boundary="=_02840903864010926098028404197_="

--=_02840903864010926098028404197_=
Content-Type:text/plain; charset="us-ascii"
Content-Transfer-Encoding: 7bit DB update information

--=_02840903864010926098028404197_=--
```

MAILING LIST MANAGEMENT SYSTEM AND ELECTRONIC MAIL TRANSMITTING/RECEIVING APPARATUS

BACKGROUND OF THE INVENTION

The invention relates to a technology of controlling distributing and relaying a mailing list of an electronic mail, and is an electronic mail bypass processing control system for bypassing and transferring, in case a fault occurs in a server (relay server) on a transfer route, data to a destination terminal device among terminal devices registered in the mailing list without via the fault-occurred server.

A technology referred to as a mailing list is broadly known as unit for multicasting information such as an electronic mail, etc, to a multiplicity of recipients. This hitherto-known mailing list is that when the electronic mail arrives at, for example, a representative address managed beforehand as the mailing list, a management server executes a variety of transfer control processes to distribute (transfer) the electronic mail to a plurality of addresses registered in the mailing list.

At this time, the majority of electronic mails distributed (transferred) by the mailing list management server are transferred via a plurality of servers (relay servers) implementing a predetermined communication protocol as in the case of, for instance, a normal electronic mail.

Herein, in case the transfer of some electronic mails fell into a failure due to an occurrence of fault in a server on a transfer route, it follows that the mailing list management server or a transfer server just anterior thereto repeats re-transferring the failure electric mails several times to the fault-occurred server at a predetermined time interval. In case all these re-transfers fell into the failure, the server trying to transfer the electronic mails to the fault-occurred server sent an error message to a transfer source, and finished the process of transferring the electronic mails.

On the other hand, as for the addresses registered as transfer destinations in the mailing list, all the addresses indicating users who become final destinations or terminal devices corresponding those users (which will hereinafter simply be termed terminal devices), are not necessarily registered. Namely, the one single management server executes the distributing (transferring) process, and besides the transferring process can be shared by providing, for example, a plurality of relay serves serving as the management servers (which will hereinafter simply be termed relay servers) group by group. In this case, a representative address of a different mailing list is further registered in the relay server on the transfer route, and the relay server further distributes (transfers) to addresses registered in this different mailing list.

Thus, in the mailing list, there was a case in which loads applied on the servers and the network are shared. Accordingly, in case a certain server receives the electronic mail addressed to the representative address of the mailing list, this server, in addition to transferring the electronic mail to the terminal devices managed by this server itself, must transfer the electronic mail to the terminal devices out of the management of the server, and must further transfer the electronic mail to the server that manages the different mailing list, and so on.

In case the fault occurs in the relay serve as described above, however, there arose a problem that the electronic mails can not be transferred to the terminal devices managed by the relay server and to the terminal devices registered in the mailing list managed by the server.

Note that Japanese Patent Application Laid-Open Publication No. 2002-325104 by the present applicant is given as this type of prior art, however, a technology disclosed in this publication is to transmit the electronic mail to an address after being changed by utilizing absence answering information in a case where the address of the transfer destination is changed in the mailing list, but is not what assumes the fault of the relay server.

[Patent Document 1]

Japanese Patent Application Laid-Open Publication No. 2002-325104 (FIG. 1)

SUMMARY OF THE INVENTION

A main purpose of the invention is, with respect to terminal devices that are not directly managed by a server itself as a transfer source for the purpose of load sharing and with respect to a transfer to a mailing list, in case a fault occurs in a relay server managing an address of a transfer destination, to provide unit for automatically bypass-transferring an electronic mail without via the fault-occurred relay server. Further, another object of the invention is to solve the following problems.

(1) With respect to the transfer to the mailing list, even in the event of the fault being occurred in a server managing an address of a transmitting destination, there is a necessity of establishing unit for automatically transferring the electronic mail to the address of the terminal device as the transmitting destination without via the fault-occurred relay server or to the mailing list.

(2) On the occasion of establishing the transferring unit, in regards to databases to be used, there is a necessity of establishing unit for automatically synchronizing between a plurality of servers.

(3) On the occasion of detecting the occurrence of the fault in the server as the transfer destination during the process of transferring the electronic mail, there is a necessity of establishing setting unit notifying the mailing list management server or the transfer source server of information about the fault-occurred server, and for temporarily preventing the fault-occurred server from relaying the electronic mail.

(4) In the electronic mail terminal device, there is a necessity of establishing receiving unit receiving from only the mailing list management server that directly or indirectly manages the electronic mail terminal device itself or from only the transfer source server.

(5) In the electronic mail terminal device, there is a necessity of establishing unit for leaving a record as to whether the received electronic mail is sent by the server that manages directly or indirectly the self-apparatus or by a server out of the management.

(6) In the electronic mail terminal device, there is a necessity of establishing a function of changing the mailing list.

Note that all the problems must not necessarily be solved, and it shall be sufficient that any one of them is solved.

The invention is that on the occasion of receiving an electronic mail to a predetermined receiving address defined as a mailing lists there is stored mailing list information recorded beforehand with a transfer destination address of the electronic mail and a bypass-transfer destination address for bypassing the transfer destination address, and, on the occasion of transferring the electronic mail to the transfer destination address, in case a fault occurs in the transfer destination and the transferring is difficult, the bypass-transfer destination address is read out so that the received electronic mail is transferred thereto by bypassing the transfer destination address.

These units can be provided in the mailing list management server, the electronic mail relay server, and also a terminal device such as a transmitting apparatus, a receiving apparatus, etc.

More concretely, storage unit of the servers and of the apparatuses are stored with the transfer destination and the bypass-transfer destination as databases of the mailing list information, and the databases can be synchronized between the respective servers and apparatuses.

With these solution unit adopted, even in case the address in the mailing list exists in the addresses and the mailing list that are managed by the fault-occurred relay server, the transfer source can distribute the electronic mail by bypassing the relay server.

DETAILED DESCRIPTION OF THE INVENTION

Embodiments of the invention will hereinafter be described by use of the drawings.

Figure 1:
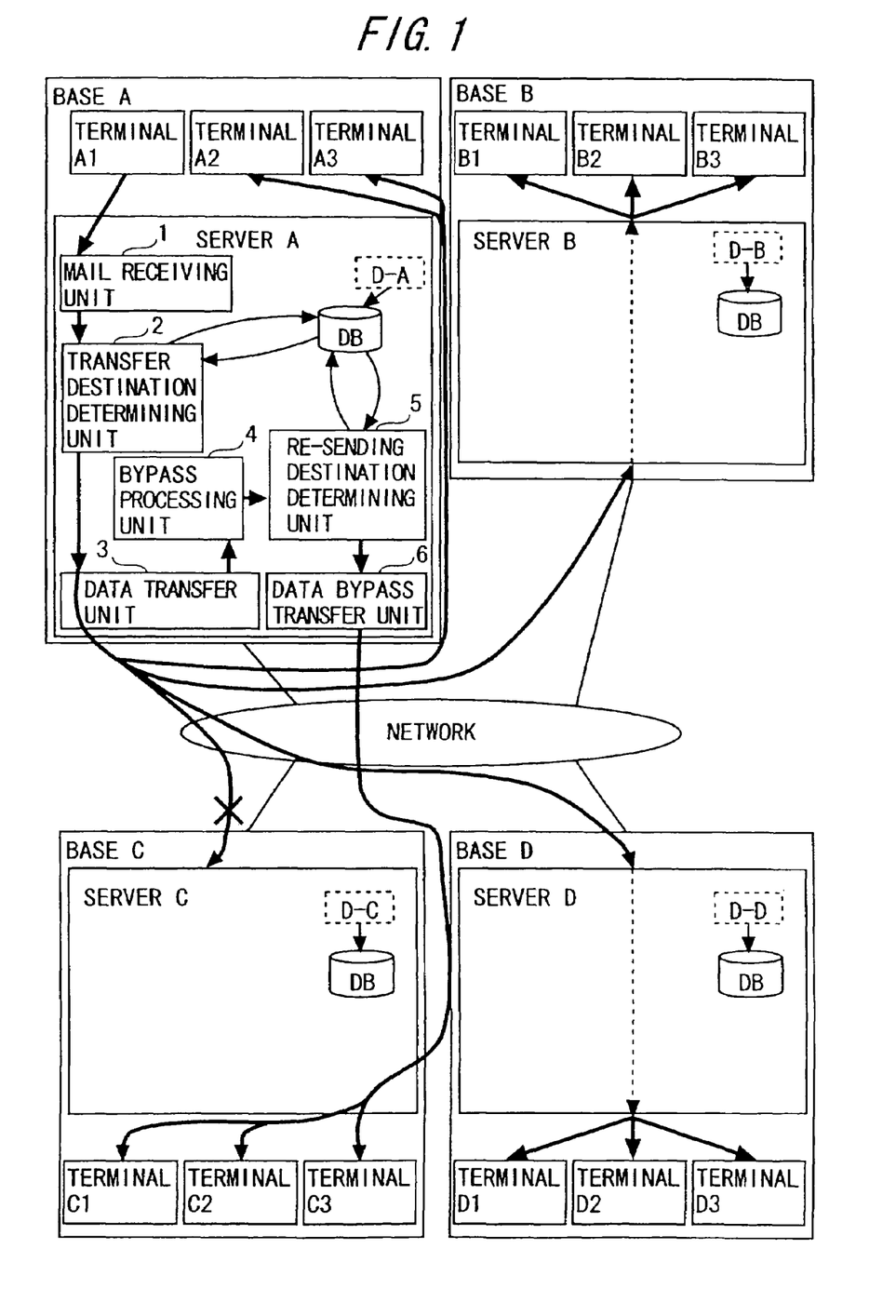
FIG. 1 is a view of system architecture of the invention.

FIG. 1 is a view of architecture, showing a mailing list management system of the invention.

In the same Figure, servers A~D are electronic mailing list management servers and also serve as relay servers.

Each server is constructed of a mail receiving unit 1 for receiving an Electronic mail from a terminal device, a transfer destination determining unit 2 for determining a transfer destination of the Electronic mail, a data transfer unit 3 for transferring the Electronic mail to the transfer destination via a network, a bypass processing unit 4 starting a bypass process when an error occurs in the data transfer, a re-sending destination determining unit 5 for searching for an address of a bypass destination from a database and setting it, and a data bypass-transfer unit 6 for bypass-transferring the Electronic mail. Then, the transfer destination determining unit 2 and the re-sending destination determining unit 5 are accessible to databases (D-A).

Each of these function units 1 to 6 is actualized by a program of an information processing apparatus configuring the server, and is actualized in a state where a central processing unit (CPU) of the server is executable of the program stored on, for example, a hard disk apparatus sequentially reading it through a memory.

Figure 2:
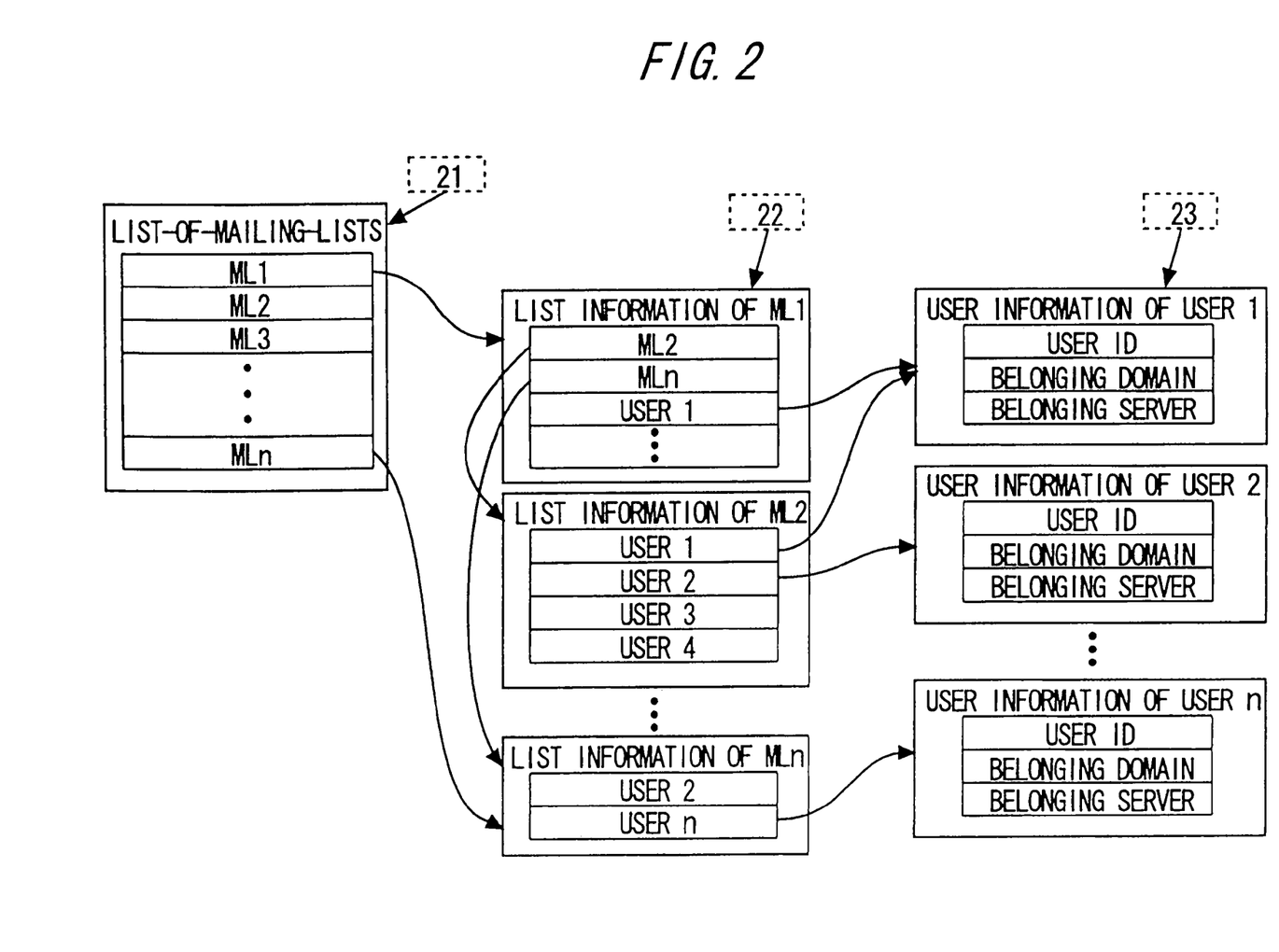
FIG. 2 is a diagram of a structure of a database used in the embodiment.

Further, the database is stored within the hard disk device, and is stored with list data of a mailing list as shown in FIG. 2 that will be described later on. In FIG. 2, notations of a user 1, a user 2, . . . represent individual addresses for identifying users serving as final destination, or individual addresses for identifying terminal devices corresponding to the users.

Note that the transfer destination determining unit 2, the re-sending determining unit 5, the data transfer unit 3 and the data bypass-transfer unit 6 are separately constructed in terms of a necessity of explanation and may also be integrated by a single construction.

Moreover, as for the databases (D-A, D-B, D-C, D-D), a common database may also separately installed.

In FIG. 1, the servers A, B, C, D and terminal devices A1~A3, B1~B3, C1~C3, D1~D3 shall be apparatuses connectable to the network such as the Internet, etc., and capable of transmitting and receiving electronic information (Electronic mails, etc.) based on SMTP (Simple Mail Transfer Protocol).

In the same Figure, upon a start of processing (step 301 in FIG. 3), the electronic mail receiving unit 1 receives the Electronic mail from the terminal device A1 (step 302), and sends it to the transfer destination determining unit 2.

Figure 3:
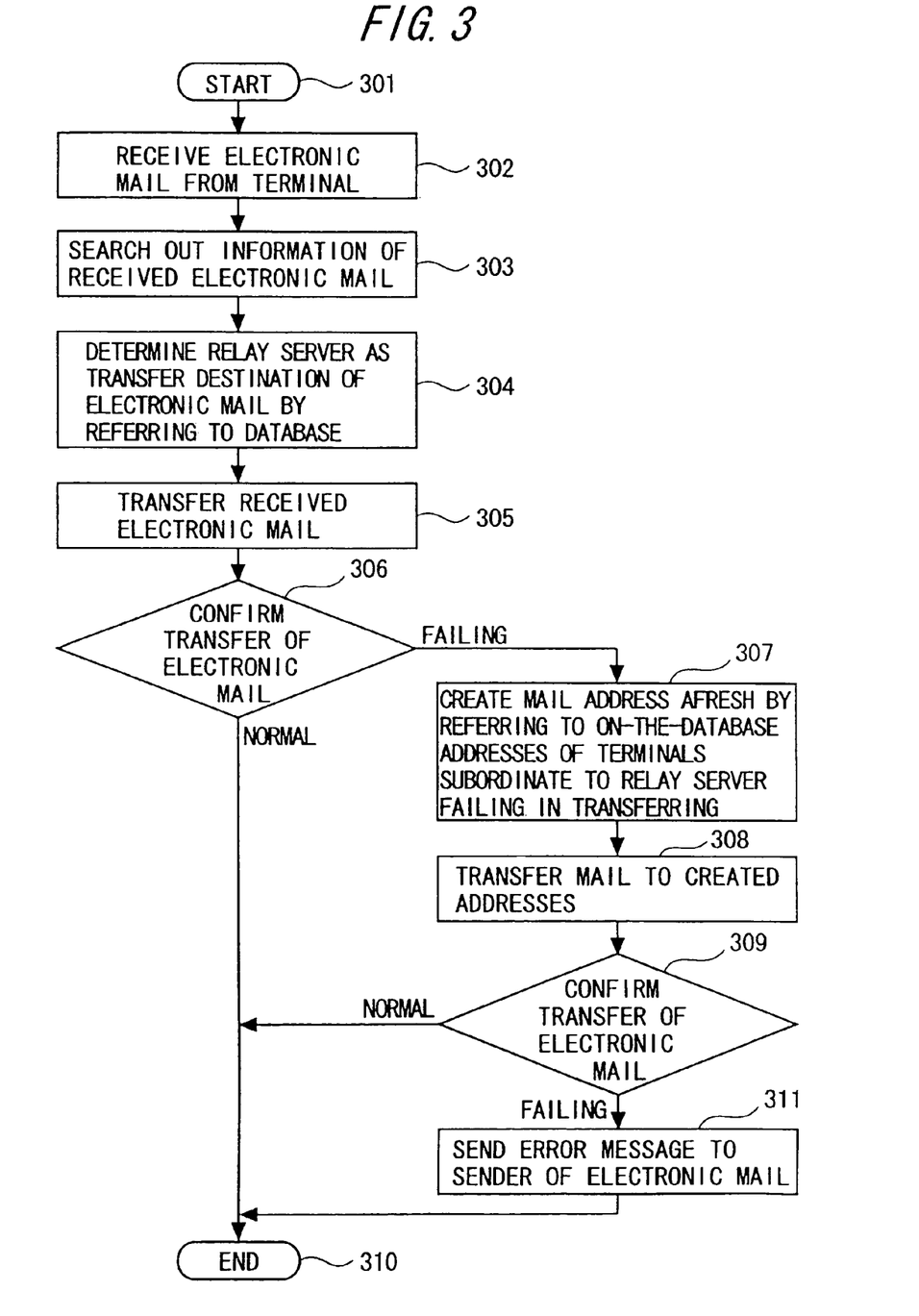
FIG. 3 is a processing flowchart in the embodiment.

The transfer destination determining unit 2 analyzes header information of the Electronic mail received from the terminal device A1 (step 303), and refers to the database (DB: D-A) with respect to information on the transfer destination. List information (a numeral 22 shown in FIG. 2) registered in the received mailing list is extracted from the database (DB: D-A), a server (the server C) managing the extracted address is determined as a transfer destination (step 304), and it is sent to the data transfer unit 3.

The data transfer unit 3 transfers the data to the server C determined as the transfer destination by the transfer destination determining unit 2 (step 305). In case the data transfer is normally completed, the processing is terminated.

Herein, in case the data transfer by the data transfer unit 3 falls into a failure (step 306), the transfer process is repeated three times. In case all these three transfers fall into failures, the bypass processing unit 4 is notified of this.

The bypass processing unit 4 notifies the resending destination determining unit 5 of only the information of the server (the server C) as the transfer destination with the failure in the data transfer unit 3.

The re-sending determining unit 5 searches for and searches out the addresses of the terminal devices (the terminal devices C1~C3) subordinate to the server C having failed in transferring from the database (DB), and determines them as new transfer destinations (step 307). At this time, the database (DB) has a structure in FIG. 2 that will hereinafter be explained, and hence the new transfer destinations can be determined by referring to user information 23.

The data bypass-transfer unit 6 bypass-transfers the Electronic mail to the new transfer destinations (the terminal devices C1~C3) created as described above (step 308).

In case the transfer is normally completed, the processing is terminated (steps 309, 311). If the data transfer falls into the failure, the re-sending process is repeated three times only; in case all the re-sending processes fall into the failures, it is judged that faults occur in the terminal devices (the terminal devices C1~C3), then an error message is sent back to the terminal device A1 as a sender, and the processing comes to an end (steps 310, 311).

Note that in the case of failing in transferring the Electronic mail in step 306, fault information of the server C is registered on the database (DB: D-A), and from this onwards any Electronic mails shall not be transferred directly to the server C. Then, at this time the data transfer unit 3 notifies other servers (the server B and the server D) of the information (the fault information of the server C) of the server having failed in transferring, and any Electronic mails shall not be sent to the server (the server C) having failed in transferring. Concretely the fault information on the server C is registered in the databases (D-B, D-C, D-D), and the addresses of the terminal devices C1~C3 subordinate to the server C can be registered directly as addresses of the Electronic mails.

The data transfer unit 3 further notifies a server administrator (concretely an address of the server administrator) of the occurrence of the fault.

When the server (the server C) is recovered from the fault, the recovered server (the server C) notifies other servers (the servers A, B and D) that the server (the server C) has been recovered, and the transfer of the Electronic mail to the server C is permitted.

Herein, a structure of the database (DB) is shown in FIG. 2.

The database (DB) is structured of a list-of-mailing-lists 21, list information 22 of each of the mailing lists and terminal information 23 registered in the mailing lists.

The list-of-mailing-lists 21 is stored with address information of the registered mailing lists. The address information is information for specifying the mailing list, and is stored in a character string of alphanumeric characters such as ML1, etc.

The list information 22 is stored with address information of the terminal devices registered in the respective mailing lists and with address information of the mailing lists. The address information is information for specifying the terminal device registered and the mailing list, and is stored in a character string of alphanumeric characters.

The terminal information 23 is stored with the address information of the terminal device, information of a domain to which the terminal device belongs and information of the server to which the terminal device belongs.

These pieces of address information, domain information and server information are stored in character strings of alphanumeric characters.

In a case where the plurality of servers A~D are individually loaded with databases (DB), synchronization between the respective databases automatically takes place. A synchronizing method is that in case a change of the registered information occurs in one unspecified database, this database notifies other databases that the change occurs, and transmits a piece of change information thereto.

More concretely, when the bypass processing unit 4 accepts the transfer failure from the data transfer unit 3, the fault information of the server C is registered in the database (DB: D-A), and the transfer to this server C shall not be performed. Further, the servers B, D are also notifies this kin of change information of the database via the data transfer unit 3 or the data bypass-transfer unit 6, the respective databases (DBs: D-B, D-D) are updated based on this piece of fault information, and the Electronic mails shall not be transferred to the server C from the servers B, D.

Next, an electronic mail terminal device will be explained referring to FIG. 4~FIG. 6.

Figure 4:
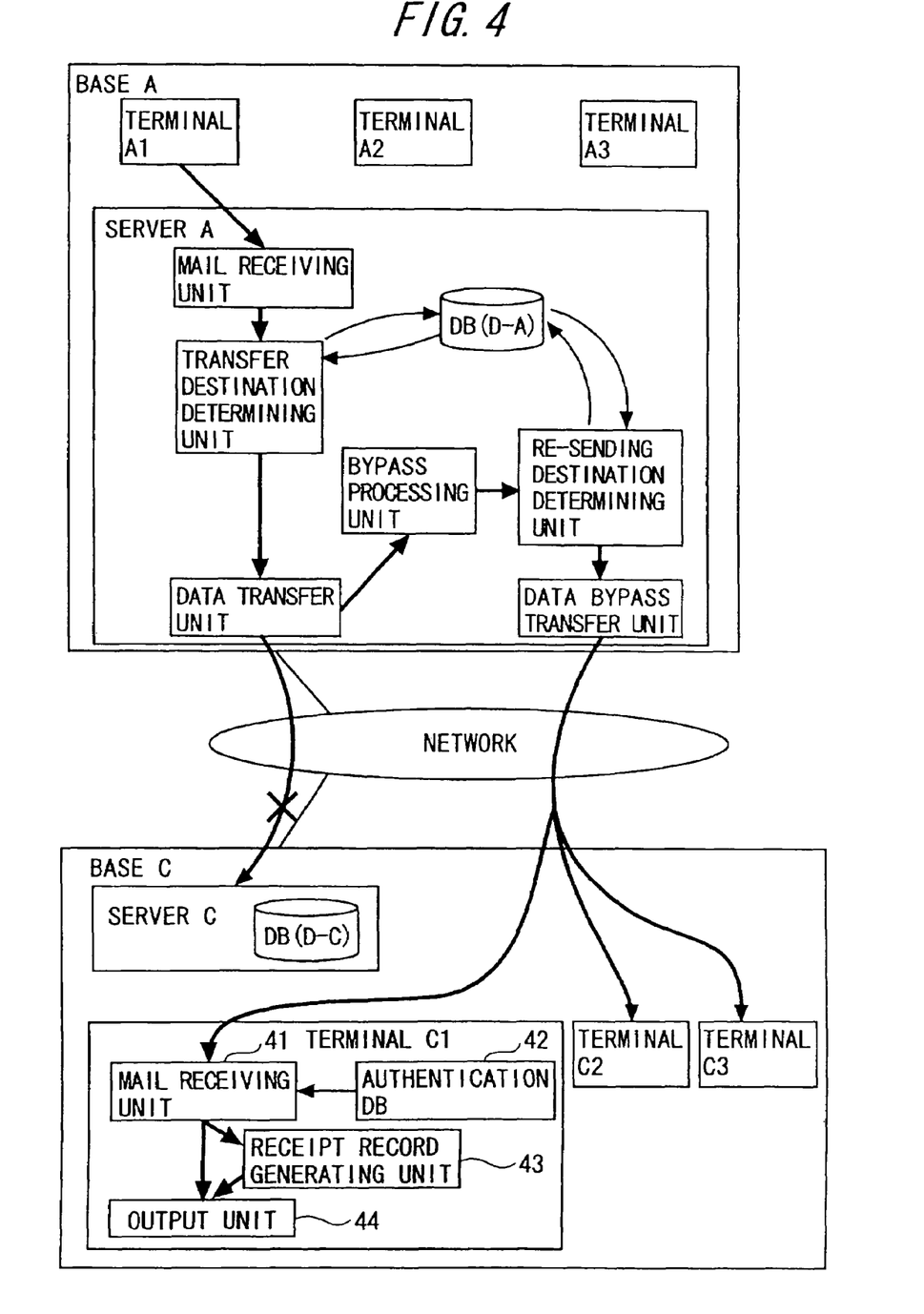
FIG. 4 is an explanatory diagram showing an authentication procedure of a server in an electronic mail terminal device.
Figure 5:
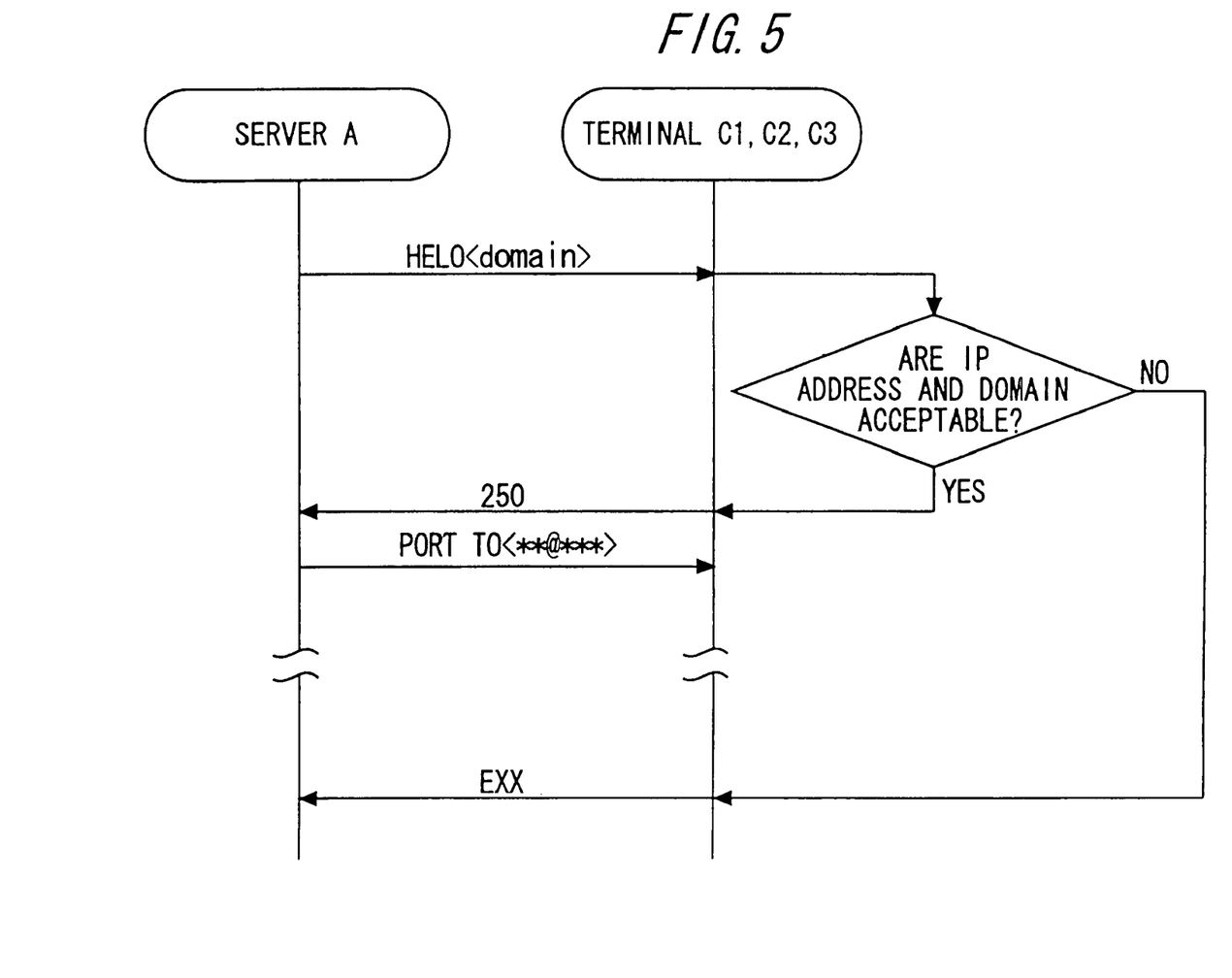
FIG. 5 is a sequence diagram showing the authentication procedure of the server in the electronic mail terminal device.
Figure 6:
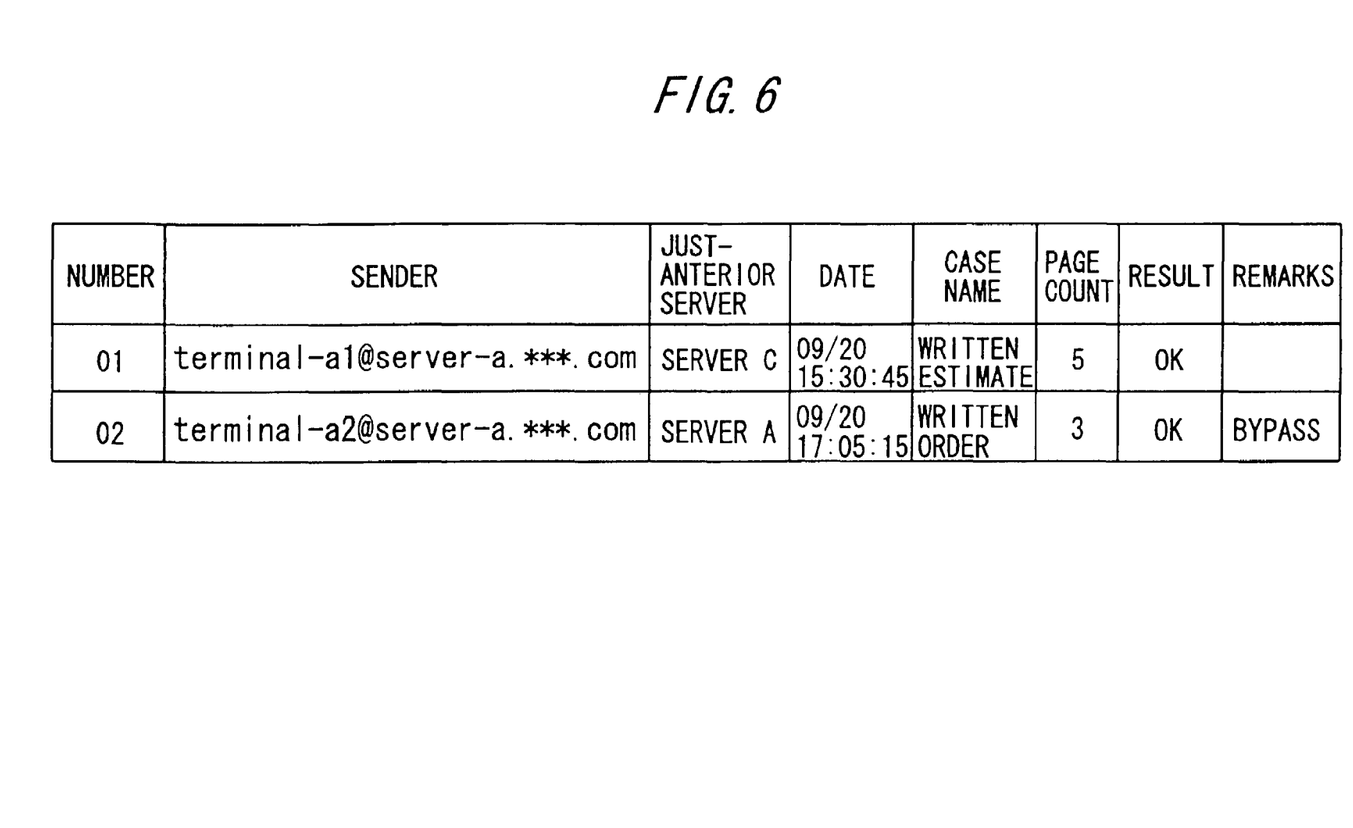
FIG. 6 is an explanatory diagram showing a receipt record generated by a receipt record generation unit of the electronic mail terminal device.

FIG. 4 is an explanatory view showing a server authentication procedure in the electronic mail terminal device, and FIG. 5 is a sequence diagram thereof.

Figure 7:
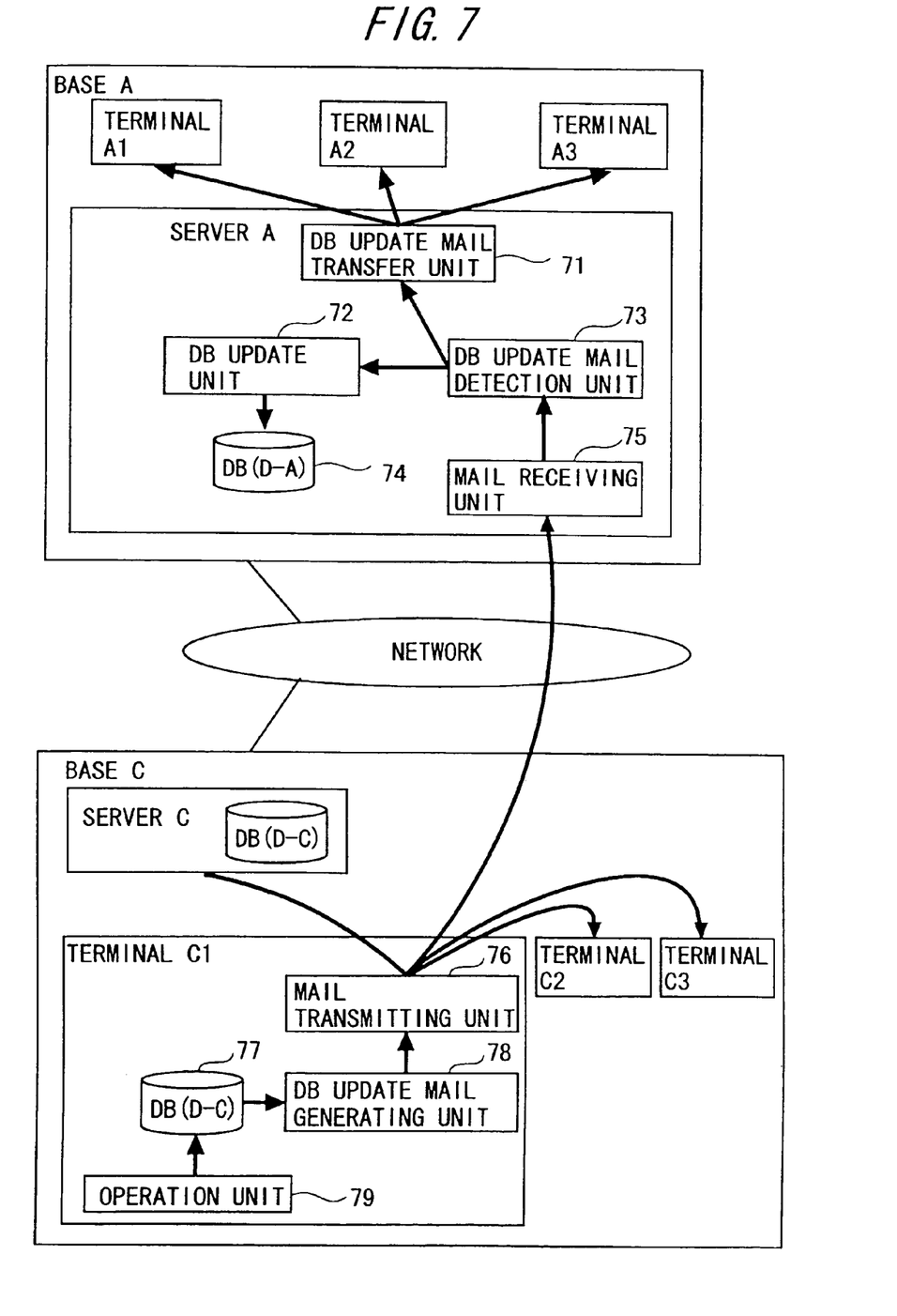
FIG. 7 is an explanatory diagram showing a database updating procedure in case a database is disposed in the terminal device.

In FIG. 4, architecture of the terminal device C1 in FIG. 1 is illustrated in detail. In the same Figure, an authentication database (authentication DB) 42 is stored with an IP address and a domain name of a server (a server for managing the terminal devices directly or indirectly) for accepting a receipt of the data based on SMTP. Note that in the case of architecture of providing also the terminal side with the database (DB) as shown in FIG. 7 which will hereinafter be described, this can be also utilized as the authentication database (authentication DB) 42.

In the same Figure, a mail receiving unit 41 of the terminal device C1 executes processes shown in FIG. 5. Further, a receipt record generating unit 43 has receipt records as shown in FIG. 6. In this receipt record, a "sender" is extracted out of a from-address of the electronic mail. A "just-anterior server" is extracted from a parameter of a HELO command of SMTP. A subject of the electronic mail is extracted as a "case name". The number of pages of an attached file is recorded as a "page count". A bypass or non-bypass is registered in "remarks". A judgment as to the bypass is made by the sequence shown in FIG. 5. Namely, in the case of receiving the electronic mail from the server that indirectly manages the terminal device, the "bypass" is registered. Further, in the case of receiving from an off-management server, an "off-management" is registered.

Moreover, an output unit 44 has a function of outputting the electronic mail (image data) received and the receipt record, and a printer and a display apparatus can be exemplified as an output apparatus. Further, print data, a file, display data, etc. can be exemplified as an output format.

In the embodiment, when unable to transmit from the server A to the server C, the server A bypasses the server C and transmits by SMTP directly to the terminal devices C1, C2, C3.

Herein, the terminal devices C1, C2, C3 compare the server information stored as described above with the information (the IP address or the domain) about the server as the sender that has been acquired by the SMTP receipt, and judges whether the SMTP receipt is accepted or not (see FIG. 5). Herein, the IP address is acquired by referring to a source address of an IP header in the received mail. A domain name of the SMTP server as the sender is acquired by referring to the parameter of the SMTP HELO command. Note that a comparison between the IP address and the domain name may be made based on whether both are coincident (a judgment by AND) or whether any one of them is coincident (a judgment by OR).

Further, the SMTP receipt from the server that indirectly manages the electronic mail terminal device can be also accepted only in the case of the bypass-transfer by having information indicating the bypass-transfer contained in the SMTP procedure and in the electronic mail header.

Moreover, in the case of accepting the bypass-transfer, this is also a case in which the server directly managing the electronic mail terminal device is unusable due to the fault, etc. The apparatus is changed in its setting so as to utilize the server indirectly managing the electronic mail terminal device in order not to cause a trouble also in the case of transmitting the electronic mail from the electronic mail terminal device.

FIG. 7 is an example where the database (DB) of each of the servers which has been explained in FIG. 4 is disposed in the terminal device (DB77 is herein shown in only the terminal device C1).

In the same Figure, an operation unit 79 provided on the terminal device C1 is an input apparatus such as a keyboard, etc. or a program and is a function unit for only accessing the database (DB) 77 and reading and writing contents thereof.

A DB update mail generating unit 78 is a function unit for detecting updating of the database (DB) 77 and generating an electronic mail for notifying of this.

On the other hand, a DB update mail detection unit 73 provided in the server A is a function unit for detecting a DB update mail and notifying a DB update unit 72 of an updated content thereof, and a DB update mail transfer unit 71 is a function unit for transferring the DB update mail to other terminal devices A1~A3.

Figure 8:
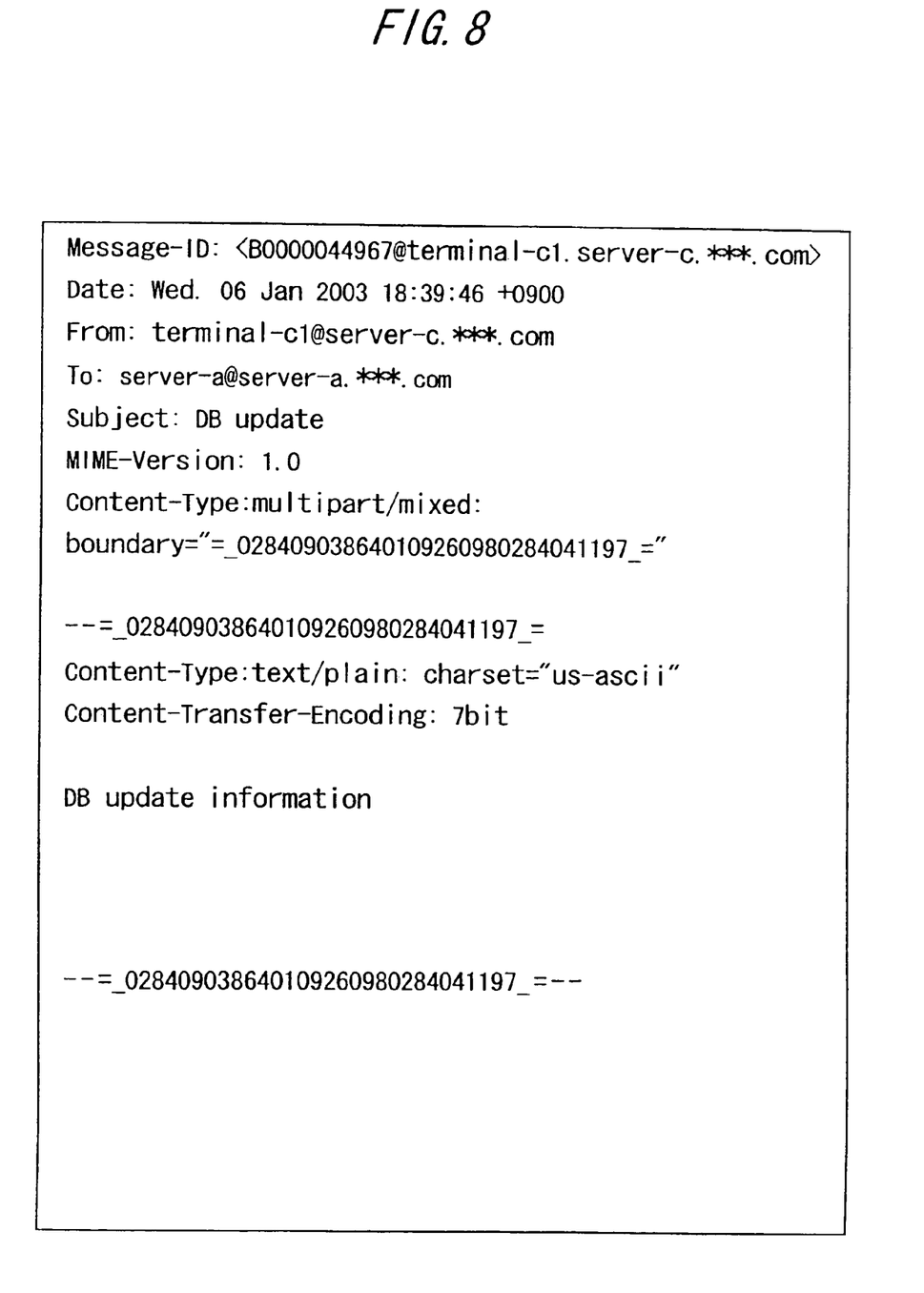
FIG. 8 is an explanatory diagram showing contents of a DB update mail.

According to the architecture shown in the same Figure, when each of the terminal devices C1~C3 makes a change, etc. in the database (DB), the DB update mail generating unit 78 generates the DB update mail which describes this content and sends it to the server A and the terminal devices C2, C3 via a mail transmitting unit 76. FIG. 8 shows contents of the DB update mail.

In the server A, when a mail receiving unit 75 receives the DB update mail from the terminal device C1 via the network, a DB update mail detection unit 73 detects this and notifies the DB update unit 72 of it, and a database (DB) 74 is updated according to the contents of the update mail. Note that other terminal devices A1~A3 are also notified of this DB update mail via the DB update mail transfer unit 71, and the databases (DBs) possessed by these terminal devices are to be updated.

According to the invention, as for the transfer of the electronic mail addressed to the mailing list, even in case the fault occurs in the relay server on the transfer route, the electronic mail can be automatically transferred to the terminal device without via the fault-occurred server or to the mailing list.

In connection with the databases used on that occasion, the synchronization between the plurality of servers is automatically taken, thereby facilitating the management of the plurality of databases.

Further, the information of the fault-occurred server can be shared, and therefore the electronic mail can be efficiently transferred by temporarily preventing the fault-occurred server from relaying the electronic mail.

In the electronic mail terminal device, the receipt from only the specified server can be made, and receipts of futile electronic mails can be prevented.

Moreover, the information for specifying the server that has sent the electronic mail is recorded, whereby an operating state of the server can be grasped.

Furthermore, from on the electronic terminal device, the mailing address information can be changed.

What is claimed is:

1. A machine programmed to operate in accordance with a stored program comprising:
    a receiving unit receiving an electronic mail to a predetermined receiving address defined as a mailing list;
    a mailing list information storage unit recording a transfer destination address of the electronic mail registered in the mailing list as a transfer destination and defined as another mailing list, and at least one bypass-transfer destination address registered in the another mailing list for bypassing the transfer destination address;
    a transferring unit transferring the electronic mail to the transfer destination address;
    a re-sending determining unit searching for and determining the at least one bypass-transfer destination address registered in the another mailing list in the mailing list information storage unit when a transfer of the electronic mail to the transfer destination falls into failure; and
    a bypass-transferring unit reading the at least one bypass-transfer address determined by the re-sending determined unit and transferring the electronic mail to the at least one bypass-transfer address;
    wherein the transfer destination, in the normal situation, sends transfer the electronic mail to the at least one bypass-transfer address registered in the another mailing list by receiving the electronic mail to the transfer destination address defined as the another mailing list.

2. The machine programmed to operate in accordance with the stored program according to claim 1, wherein the mailing list information storage unit has a synchronizing unit for synchronizing contents of mailing list information storage units with each other which are possessed by a plurality of mailing list management servers.

3. The machine programmed to operate in accordance with the stored program according to claim 2, further comprising a setting unit notifying, when the fault in the transfer destination of the electronic mail is a fault in a relay server, each of mailing list management servers of information regarding the relay server in which the fault occurred, and the setting unit setting to temporarily prevent the each of mailing list management servers from relaying the electronic mail to the relay server in which the fault occurred.

4. A machine programmed to operate in accordance with a stored program comprising:
    a mailing list information storage unit recording a transfer destination address of an electronic mail as a transfer destination defined a mailing list, and at least one bypass-transfer destination address registered in the mailing list for bypassing the transfer destination address;
    a transferring unit transferring the electronic mail to the transfer destination address;
    a re-sending determining unit searching for and determining the at least one bypass-transfer destination address registered in the mailing list in the mailing list information storage unit when a transfer of the electronic mail to the transfer destination falls into failure; and
    a bypass-transferring unit reading the at least one bypass-transfer address determined by the re-sending determined unit and transferring the received electronic mail to the at lease one bypass-transfer address;
    wherein the transfer destination, in the normal situation, sends transfer the electronic mail to the at least one bypass-transfer address registered in the mailing list by receiving the electronic mail to the transfer destination address defined as the mailing list.

5. The machine programmed to operate in accordance with the stored program according to claim 4, wherein the bypass-transferring unit includes unit for effecting a transmission, when transmitting the electronic mail, containing information indicating a bypass-transfer.

6. A machine programmed to operate in accordance with a stored program comprising:
    an electronic mail transmitting unit; and
    an electronic mail receiving unit,
    wherein the electronic mail transmitting unit comprises: a mailing list information storage unit recording a transfer destination address of an electronic mail defined a mailing list, and at least one bypass-transfer destination address registered in the mailing list for bypassing the transfer destination address; a transferring unit transferring the electronic mail to the transfer destination address; a re-sending determining unit searching for and determining the at least one bypass-transfer destination address registered in the mailing list in the mailing list information storage unit when a transfer of the electronic mail to the transfer destination falls into failure; and a bypass-transfer transferring unit reading the at least one bypass-transfer address determined by the re-sending determined unit and transferring the electronic mail by bypassing the transfer destination address to the at least one bypass-transfer address, and
    the electronic mail receiving unit comprises:
    receiving unit receiving an electronic mail; detecting unit detecting sender information from the received electronic mail;

a storing unit storing mailing list information to which the apparatus itself directly or indirectly belongs; and a receiving electronic mail control unit for controlling, in case the detected sender information is contained in the mailing list information to which the self-apparatus directly or indirectly belongs, the receiving unit to receive the electronic mail.

7. A mailing list management method performed by a computer comprising:

a step of receiving an electronic mail to a predetermined receiving address defined as a mailing list;

a step of recording a transfer destination address of the electronic mail registered in the mailing list as a transfer destination and defined as another mailing list, and at least one bypass-transfer destination address registered in the another mailing list for bypassing the transfer destination address;

a step of transferring the electronic mail to the transfer destination address;

a step of searching for the transfer destination address in the mailing list information storage unit when a transfer of the electronic mail to the transfer destination falls into failure;

a step for determining the at least one bypass-transfer destination address registered in the another mailing list as the transfer destination address searched for;

a step of reading the determined at least one bypass-transfer destination address; and a step of transferring the electronic mail to the determined at least one bypass-transfer destination address;

wherein the transfer destination, in the normal situation, sends transfer the electronic mail to the at least one bypass-transfer address registered in the another mailing list by receiving the electronic mail to the transfer destination address defined as the another mailing list.

8. A computer readable storage medium stored with a program, wherein the program when executed by a processor performs the steps of:

a step of receiving an electronic mail to a predetermined receiving address defined as a mailing list;

a step of recording a transfer destination address of the electronic mail registered in the mailing list as a transfer destination and defined as another mailing list, and at least one bypass-transfer destination address registered in the another mailing list for bypassing the transfer destination address;

a step of transferring the electronic mail to the transfer destination address;

a step of searching for the transfer destination address when a transfer of the electronic mail to the transfer destination falls into failure;

a step for determining the at least one bypass-transfer destination address registered in the another mailing list as the transfer destination address searched for;

a step of reading the determined at least one bypass-transfer destination address; and a step of transferring the electronic mail to the determined at least one bypass-transfer destination address;

wherein the transfer destination, in the normal situation, sends transfer the electronic mail to the at least one bypass-transfer address registered in the another mailing list by receiving the electronic mail to the transfer destination address defined as the another mailing list.

* * * * *